US011247924B2

United States Patent
Truong

(10) Patent No.: US 11,247,924 B2
(45) Date of Patent: Feb. 15, 2022

(54) APPARATUS FOR TREATING WASTEWATER AND A SYSTEM FOR COLLECTING AND TREATING WASTEWATER COMBINING RAINWATER DRAINAGE

(71) Applicant: Dan Van Truong, Ha Noi (VN)

(72) Inventor: Dan Van Truong, Ha Noi (VN)

(73) Assignee: DAN VAN TRUONG, Ha Noi (VN)

( * ) Notice: Subject to any disclaimer, the term of this patent is extended or adjusted under 35 U.S.C. 154(b) by 906 days.

(21) Appl. No.: 15/953,457

(22) PCT Filed: Oct. 12, 2016

(86) PCT No.: PCT/VN2016/000005
§ 371 (c)(1),
(2) Date: Nov. 15, 2018

(87) PCT Pub. No.: WO2017/201552
PCT Pub. Date: Nov. 23, 2017

(65) Prior Publication Data
US 2021/0032137 A1    Feb. 4, 2021

(30) Foreign Application Priority Data

May 16, 2016    (VN) .............................. 1-2016-01731

(51) Int. Cl.
*C02F 3/10*        (2006.01)
*C02F 3/12*        (2006.01)
(Continued)

(52) U.S. Cl.
CPC .............. *C02F 3/102* (2013.01); *C02F 3/109* (2013.01); *C02F 3/1242* (2013.01); *C02F 3/165* (2013.01);
(Continued)

(58) Field of Classification Search
CPC ........ C02F 3/102; C02F 3/109; C02F 3/1242; C02F 3/165; C02F 2103/001;
(Continued)

(56) References Cited

U.S. PATENT DOCUMENTS 5,277,798 A *   1/1994   Ueda ..................... C02F 3/1221
                                                            210/151
5,500,112 A *   3/1996   McDonald .............. C02F 3/201
                                                            210/151
(Continued)

FOREIGN PATENT DOCUMENTS

FR          2984873 A1 *  6/2013  ................ C02F 3/06
JP        H0639391 A  *   2/1994  ............ Y02W 10/10
(Continued)

OTHER PUBLICATIONS

International Search Report PCT/VN2016/000005, dated Oct. 31, 2017.

*Primary Examiner* — Claire A Norris
*Assistant Examiner* — Ekandra S. Miller-Cruz

(57) ABSTRACT

The present invention relates to an apparatus for collecting and treating wastewater (1) based on biodegradation-recombination-biodegradation process, comprising: a shell (1.1), the space inside the shell is divided into a first chamber (1.2) and a second chamber (1.3) by a divider wall (1.4), wherein: the first chamber (1.2) contains biological medium suitable for heterotrophic microorganisms growth; the second chamber (1.3) contains biological medium suitable for autotrophic microorganisms and heterotrophic microorganisms growth. The present invention also relates to a system for collecting and treating wastewater combining rainwater drainage used for building, comprising: at least one wastewater treatment apparatus (1) above; a indoor pipe system for collecting and transferring wastewater, rainwater comprising a main vertical pipe (2), substantially horizontal (Continued)

branch pipes; and a outdoor pipe system for transferring wastewater combining rainwater drainage comprising a horizontal pipe (3) for connecting the indoor pipe system for collecting and transferring wastewater, rainwater to at least one wastewater treatment apparatus (1) above.

10 Claims, 9 Drawing Sheets

(51) Int. Cl.
*C02F 3/16* (2006.01)
*C02F 103/00* (2006.01)

(52) U.S. Cl.
CPC .. *C02F 2103/001* (2013.01); *C02F 2201/007* (2013.01)

(58) Field of Classification Search
CPC .......... C02F 2201/007; C02F 2103/002; C02F 2103/005; C02F 3/04; Y02W 10/10
USPC .......................................................... 210/615
See application file for complete search history.

(56) References Cited

U.S. PATENT DOCUMENTS

| | | | |
|---|---|---|---|
| 6,890,439 B2 * | 5/2005 | Cameron | .................. C02F 3/04 210/617 |
| 2005/0126995 A1 * | 6/2005 | Couch | .................. C02F 3/1221 210/620 |

FOREIGN PATENT DOCUMENTS

| | | | | | |
|---|---|---|---|---|---|
| JP | H09155383 | A | * | 6/1997 | ............ Y02W 10/10 |
| JP | 2004174433 | A | * | 6/2004 | ............ Y02W 10/10 |
| JP | 3656820 | B2 | * | 6/2005 | ............ Y02W 10/10 |
| JP | 2005177695 | A | * | 7/2005 | ............ Y02W 10/10 |
| JP | 3688146 | B2 | * | 8/2005 | ............. B01D 61/18 |
| VN | 1-0010272 | A1 | | 1/2011 | |
| VN | 1-0013929 | A1 | | 3/2013 | |
| VN | 2-0001250 | | | 4/2013 | |
| VN | 1-0014325 | A1 | | 6/2014 | |
| WO | WO-2009109308 | A1 | * | 9/2009 | ........... B01D 63/082 |

* cited by examiner

APPARATUS FOR TREATING WASTEWATER AND A SYSTEM FOR COLLECTING AND TREATING WASTEWATER COMBINING RAINWATER DRAINAGE

FIELD OF THE INVENTION

The present invention belongs to the environmental field. In particular, the invention relates to apparatus for treating wastewater by biotechnology process based on Biodegradation-Recombination-Biodegradation process, and a system for collecting and treating wastewater that is capable of draining rainwater comprising said apparatus.

BACKGROUND OF THE INVENTION

Currently, the techniques to collect and treat wastewater and drainwater has many disadvantages and do not meet practical needs.

Wastewater created by people causes serious environmental pollution. Meanwhile, techniques to collect, treat wastewater and drainwater is now too old and very outdated, the achievements of modern biotechnology have not been applied appropriately in the environmental field.

As already said, the objective of the waste treatment is to reduce the level of contaminants to a level lower than an allowed threshold by means of physical, chemical, biological measures or combination of the these measures.

A wastewater treatment system comprises three parts: wastewater collection network, wastewater treatment plant and treated water receiver.

Wastewater treatment is done in two ways: centralized and decentralized. The decentralized wastewater treatment method has many advantages over centralized wastewater treatment method, and that is a trend which is targeted in industrial developed countries and it is believed that the decentralized wastewater treatment method is a method that will be implemented in the 21st century. The development of wastewater treatment technologies can be evaluated into three levels: level 1, 2, 3. Specifically:

Primary treatment (grade 1) related to the study and control of contaminants in the water that may be perceived by the human senses such as opaque substances, unpleasant odor causing substances.

Secondary treatment focus on removing organic matter dissolved in water in order to prevent the further decomposition of the organic matter in water that causes unpleasant odor and depletion of dissolved oxygen in the water.

Tertiary treatment which has been noticed for about 20 years, focus on control of nutrients (phosphorus, nitrogen compounds), chemical compounds which have potential to cause serious diseases and genetic modification (hormones, group of organic compounds persistent in the environment).

Domestic, medical, manufacturing, processing and livestock wastewater all contain waste which are capable of digesting by microorganisms (called biodegradable) to release energy and natural gas. Precipitated solids which do not pollute the environment and will be taken back to the environment.

Biodegradable waste which is present in the water at a certain threshold on its composition, content will not cause unpleasant smell and inhibition of microbial activity. Biodegradable waste is also as very good food for microbial species and other creatures.

When presence in the water, biodegradable waste is very easily decomposed (hydrolysed) and oxidized to generate gaseous chemical compounds and chemical compounds soluble in water. The gaseous chemical compounds evaporate that causes air pollution, respiratory diseases to humans and animals.

Some water soluble chemical compound are generated during the decomposition and oxidation of waste in the water. They dissolved in water to make the concentration of certain components several times higher than their allowable levels and thereby inhibiting the activities of aquatics (including organisms and microorganisms in water), aquatic organisms may be destroyed or develop in a negative way which can not be controlled.

As already known, wastewater collection techniques completely depends on wastewater treatment technologies currently applied. A wastewater treatment technique always combines with a corresponding wastewater collection technique.

The state of wastewater treatment technology is as following:

The conventional waste treatment technology capable of biodegrading waste in the aquatic environment in the world today are applying the principle of decomposition (mineralization) combining activated sludge process based on anaerobic-aerobic-settlement-antiseptic process. Specifically:

The process of anaerobic digestion is a technical stage in the current wastewater treatment. The essence of this stage is soaking solid waste to decompose (hydrolyse) it into gas compounds having the general chemical formula ($C_xH_y$), acid radicals such as $NO_3^-$, $PO_4^{3-}$ and organic acids with the general formula ($C_xH_y$-nCOOH). These gases have the ability to evaporate, they release into the environment through air vents, a large amount of soluble matter are retained in water.

The condition of wastewater aims to distribute the wastewater to the processing system fairly uniformly in terms of both quality and quantity. At the stage of wastewater conditioning, since the amount of toxic gas escape the water environment is very high, the concentration of soluble substances capable of evaporating significantly decreases. Due to not using conditioning, some apparatus have high water-soluble gas contents.

Primary sludge filtration is a step of separating the sludge out of the water, or filtering and keep the sludge for further complete anaerobic decomposition. Most medium or large treatment plants utilize deposition aid chemicals to collect the sludge. Some treatment plants utilize natural settlement method without using deposition aid chemicals.

Aerobic and anoxic conditions: waste decomposition process is an aerobic process in which aerobic microorganisms digest the soluble wastewater by oxidation, while anoxic conditions favour the reduction process. Aerobic process also effects in releasing some volatile compounds from the wastewater into the atmosphere. In wastewater treatment techniques, aerobic processes and anoxic process are usually combined by introducing microogarnisms carriers in tubular form or porous form to the aerobic apparatus.

Secondary sludge filtration is a clarifying process which takes place after conducting the aerobic for separating sludge from the water by natural settlement method, physical settlement or deposition aid to obtain a waste sludge.

Anticeptic process of treated wastewater is a very important step because there are lot of microorganisms, especially the larvae causing illness, remaining in the water after treatment, therefore a chemical or physical rays should be used for disinfection. The chemical or physical antiseptic process both require apparatus which is complicate and easy to be broken.

Current wastewater treatment technology allow limited mixing kinds of wastewater from sources to each other, do not allow to collect wastewater combining with the rainwater drainage. Meanwhile the issue of investment for construct a wastewater collecting system separately from rainwater in urban areas is now complicated and expensive.

The current wastewater treatment systems have to use too many electrical appliances such as mixers, blowers, pumps sucking mud, sludge dewatering, chemical mixer, chemical dosing pumps, pumps water . . . thus consume a lot of energy, a possible failure of electrical equipment is very high, therefore maintenance and replacement of the system must be done more frequently, thus it is very complicated and expensive.

These wastewater treatment techniques require conditioning tank, preliminary treatment system for filtering sludge, treating sludge, collecting and treating gas that is very complicate. In addition, the current wastewater treatment techniques need to use a great amount of chemical or physical rays for disinfection and deposition aid chemical that indirectly causes industrial emissions, increasing the greenhouse effect, residue chemical used for disinfection affect to the biodiversity.

The state of centralized wastewater treatment plants as follows:

Most centralized treatment plants has a disadvantage in that they entirely depend on the amount of collected wastewater. In fact, in the dry season, in the centralized water treatment plant, the wastewater is collected in an amount of usually 20% lower than the total amount of wastewater sources as planned, leading to lacking of water for treatment plant, not enough load to operate. In the rainy season, the amount of collected wastewater is very high. The amount of wastewater in the rainy season in some areas is 2 times higher than the amount of water from waste sources as planned, leading to the treatment plant is overload. In addition, the centralized wastewater treatment plants is often accompanied by a collection system which is expensive and complex, strictly requiring the synchronization between the treatment system and collection system. Centralized treatment plant has a fixed capacity of treatment and depending on the design that the plant can be a batch or continuous treatment.

The state of the decentralized wastewater treatment as follows:

Currently, decentralized wastewater treatment, household source discharge, residential areas, areas with geographical factors, characteristics of the waste sources are being developed and became popular. Compared to centralized treatment system, the decentralized processing system has advantages: The cost of building wastewater collecting system is low, less disruptive of available infrastructure (roads, housing, building which the system pass through), taking advantage of terrain available to reduce operating costs (eg taking advantage of the terrain slope to maintain flow through the hydrostatic pressure), easy to manage the intake basin and potentially reuse of treated wastewater. However, difficulties will occur in processing technology due to the variety of types of waste, difference in types and contamination levels of contaminants needed to be treat, maintain operating conditions of the treatment system.

The state of the systems for collecting domestic wastewater for treatment plants as follows:

Domestic wastewater is collected in two ways, depending on the state of treatment technology of each country. Specifically, there are two typical ways for wastewater collection as follows:

The first way: Toilet wastewater (toilet) is mixed with wash water (gray water and black water mix) and then collected on the treatment plant or be pre-treated by septic tanks then seeped into the ground.

The second way: toilet wastewater is separately decomposed (mineralized) by septic tanks. Then, the wastewater after mineralization is mixed with washing water and treated or discharged directly into the rainwater drainage system. The purpose of the septic tank is used to mineralize the waste into solid waste to release through the exhaust vents, while the solute in the wastewater is pushed out of the apartment, enter the rainwater drainage system, or self-absorbed to the ground, causing serious environmental pollution and storm water drainage systems often cause trapped floods.

The rainwater drainage systems in residential and urban areas comprise underground sewer pipes, open rainwater canals (drainage system) for transferring rainwater without a separate wastewater collection system.

Domestic waste which is contained in water includes non-biodegradable waste or biodegradable waste which degrades in a long time. This waste is discharged by human or is formed by nature, such as dirt, algae, moss, algae.

Waste sludge in water includes inorganic and organic sludge which is already present in the water or formed during collecting and treating wastewater.

Exhaust gas generated from wastewater includes: NH3, CH4, CO2, N2 . . . organic, inorganic acids . . . they escape the water and get into the air. For the open channel, emissions are distributed along channels in big area, thus the pollution does not occur locally, the highest levels of pollution is only a few dozen times compared to allowable levels. For the closed pipe, exhaust gas is free to focus in the discharge holes. At the discharge holes, toxic gases concentrate to cause local pollution of hundreds or thousands of times compared to the allowable limits.

Chemicals in wastewater mostly include detergents, sterile used for equipment such as kitchen, toilets, medical instruments, medicines, water film, the chemical substances used in the analysis room, laboratory, and additives used for production.

In the industrial zone, a type of wastewater which is contaminated with chemicals, heavy metals generated from the production process in factories is separately collected to process prior to discharge into the collection system of the industrial parks. In the industrial and handicraft households, villages, the production wastewater containing chemicals and heavy metal components have not been separated for disposal. However, the amount of chemicals and heavy metal components in wastewater in industrial zones and villages are often negligible. In the treating process of wastewater treatment, chemicals are added to the wastewater to neutralize some chemicals contained in the wastewater, or to assist the deposition or float of sludge and some special chemicals is used to disinfect wastewater after treatment.

As known, the current wastewater treatment systems use substrates and carriers for microorganism which has not improved much and of type available on the market, appropriate to existing biotechnology exhibiting low effect in treatment. The substrates or carriers for microorganism in bulk forms have many drawbacks. Specific:

Microorganisms attach to the substrates with low surface area. Dense microorganisms populations do not have sufficient attached area, thus they form mass and settle to the bottom of the apparatus and form biological sludge which required biological sludge to be sucked out regularly. On the other hand, in order to have sufficient microorganisms necessary to biological bed to meet the processing capacity, it is necessary to ensure achievement of mass or to increase the surface area of the substrate with the same mass of the microorganisms (the substrate has a larger surface area) or increase the volume of treating tank.

Carriers for microorganism have a large surface area at the function zones of anaerobic, aerobic, in which:

Anaerobic carriers easily connect together to form a solid mass. This carriers is vulnerable to dysfunction in a long time and does not operate in accordance with the principle, lead to prolonged periods of water fail quality requirements for discharge into the environment.

In aerobic compartment, the agglomeration due to the development of integrated biomass makes aerobic mobile carriers becomes anaerobic. In particular, the area around the middle of the disk of gas or gas distribution pipes will have no air, thus in this area, there is a phenomena of the integrated carriers became anaerobic region, and pressure losses in the gas distribution plate and gas distribution pipes is very high.

The existing biological carriers and substrate have many disadvantages, namely biochemical efficiency is not high and energy intensive, require unblock, dredge much during use, operating system is unstable and produce a lot of sludge.

Besides, the current treatment techniques do not allow mixing types of wastewater together to handle but only allow mixing certain types of wastewater together. These techniques do not allow rainwater to accompany wastewater to treatment equipment, and it is still necessary to separate rainwater and wastewater, preventing highly alkaline substances, detergents, antibiotics, chemicals substances in medicine, still have to use chemicals such as chlorine or ozone or physical rays for disinfection.

The state of system for collecting wastewater and drainage:

The collection system includes vertical pipe system (axis) and a indoor horizontal pipe system (axis).

The indoor discharge pipe system (axis) comprises a discharge system dedicated for rainwater, kitchen water, toilet discharge water, washing water, and energy dissipaters and energy storage devices used for drainage.

The vertical pipe system (axis) for indoor wastewater drainage, with the previous viewpoint that "water flow in a stream in vertical axis", follow the flow pipe from top to bottom. But from the viewpoint of science that the water in the pipe line freefall at speeds faster steadily, with the acceleration of gravity ($9.8$ $m/s^2$).

The dry ventilation (vent pipe separate with drainage) does not have higher utility compared to the wet ventilation (ventilation and drainage pipe along the same pipe line), it complicates the process of construction the connecting pipe, occupy more space, cause high cost and difficulty in operation and maintenance.

The wet ventilation has proved advantages when we have to be aware of the movement of wastewater in a vertical pipe is freefall.

The drain system of horizontal lines indoor includes branch pipes transferring wastewater to the main vertical pipe and a main pipe transferring wastewater from inside to outside of the house.

The system of pipe for indoor wastewater drainage includes pipes for only rainwater drainage, pipe for kitchen wastewater drainage, pipe for toilet wastewater drainage, pipe for washing wastewater drainage, and other energy dissipation or storage device used for drainage work.

Outdoor drainage system, horizontal axes:

Water collection and drainage systems outdoor includes the open type and closed type. Depending on the terrain, the type or location of wastewater, the collection systems are designed in closed or open type. Conventional methods of construction system for collecting and drainage wastewater outdoor by joining pipes or culverts together, after a certain distance, they put the manholes to siltation and exhaust. Some wastewater collection system (due to strict requirements) is made of closed pipe system, integral pipe made of material such as HDPE; u.PVC . . .

Horizontal collection system will reduce the oxygen ($O_2$) supplied to the microorganisms in the wastewater, resulting in the wastewater in a state of deep anaerobic, therefore generates lot of toxic gas escaped into external environment, the focus of this toxic gas in the vent hole of the collection system. On the other hand, this collection systems are difficult to repair and difficult to detect clogged point, difficult to dredge when them are blocked.

With concrete drainage system built by connecting segments together, after a period of use, the process of geological movements, the joints will be separated. When it does not rain, the wastewater will follow joints escape and seeps into groundwater, escaped waste facilitates the development of microorganisms, organic liquid sludge prone to subsidence, destroy other structural such as sidewalks, roadways. When heavy rain, water from outside flow into the pipe via leaked joints, bringing all the dirt, causing congestion of pipes; Microorganisms grow in the interstices of the sediment, creating an area of blocks, cut and create lightning filled merchandise inside the drain, leading to dredge the sewers become complicated.

Due to existing treatment technology do not allow, and limit the water flow, thus collecting systems restrict the incorporation of the sources of wastewater and do not allow to mix wastewater with rainwater.

Even the collection system that enables to collect some types of wastewater in a building including toilet, bathroom, kitchen, floors, cleaning wastewater in a common pipe but it has not allow rainwater to come along with wastewater.

SUMMARY OF THE INVENTION

The purpose of the present invention is to overcome the drawbacks mentioned above.

To achieve that purpose, according to the first aspect, the present invention provides an apparatus for treating wastewater treatment that generates less sludge, and can treat both the sewage mixed with rainwater, without the use of chemicals (such as chlorine and ozone) for disinfection. The apparatus has a simple structure, easy to operate, easy to make on an industrial scale, etc.

According to a second aspect, the present invention provides a systems for collecting, treating wastewater combining with rainwater drainage comprising at least one above apparatus for wastewater treatment which can treat wastewater mixed with rainwater, without the use of chemicals (such as chlorine and ozone) for disinfection, is capable of stably treating water both in the dry season and the rainy season.

The apparatus for treating wastewater of the present invention has been manufactured in the form of modular shells combined from multiple parts of the same size, so it can be assembled into the enclosure of arbitrary size. Additionally, many apparatuses of present invention can be assembled in parallel depending on the treatment capacity required.

The advantage of the apparatus for treating wastewater of the invention is a configuration which is suitable for the autotrophic and heterotrophic microorganism to act together based on Biodegradation-Recombination-Biodegradation process, in which:

Biodegradation is a process in which heterotrophic microorganisms digest organic compounds to self increases volume and simultaneously oxidizing organic compounds to generate energy and natural gas.

Recombination is a process in which autotrophic microorganisms synthesize organic compounds from minerals generated by the decomposition of a part of initial waste, $CO_2$ and bioenergy, chemical energy.

At the end of peak time of discharge, the amount of residual waste in the environment is very small, that is when heterotrophic organisms digested most of the organic compounds, the microorganisms will digest themselves to quickly reduce the volume of sludge in the environment, this factor allows the removal and does not require an conditioning wastewater tank. According to the laws of nature, the most robust organisms can be survive and prepare for a next biological cycle.

A very stringent requirements of this microbiological processes is that the levels of water-soluble compounds must be very low and enough oxygen to meet the processes of digestion and enough $CO_2$ for synthesizing process. By this process, microorganism synthesize biomass and organic compounds which are present in a form of organic sludge. This organic sludge is a food source for the heterotrophic organisms in a next biodegradable process.

The biodegradation-recombination-biodegradation take place as follows:

Untreated wastewater is added into the preliminary treatment equipment, heterotrophic microorganisms digests waste (biodegradation process). A part of waste which is digested in the process of collecting, processing in station is converted by autotrophic microorganisms into organic compounds (the recombination process) and these organic compounds are used as materials for heterotrophic microorganisms to digest. The heterotrophic microorganisms digest each other to reduce the biomass (autogenous biodegradation).

The nature of the wastewater treatment technology is to create a favourable environment for biochemical reactions of microorganisms booming.

Along with processing techniques are wastewater collection systems in sync, distinctive and simpler systems compared to existing systems.

The apparatus for treating wastewater according to a first aspect of the present invention comprises:

A shell comprises two halves, with each half-shell is made from same pre-made plates and assembled together, so that it mays constitute enclosure with arbitrary size as required.

The space inside the shell is divided into two biological treating chambers and may has a third compartment containing treated water used to dilute the wastewater at the water inlet, the first chamber is equipped with beds for containing heterotrophic microorganisms to digest waste and autotrophic microorganisms. The second chamber containing the autotrophic microorganisms and heterotrophic microorganisms.

Upon the discharge, the microbial activity increased markedly. Quantity (mass) are developing aggressively, biological sludge is increased very strongly. At discharge end, the microorganisms digest each other, integrated volume decreases and return the initial state. The process is repeated according to the discharge cycle.

Wastewater should be diluted to a certain extent so as not to inhibit the activity of microorganisms, while also increasing the density of the waste in contact with microorganisms, so the apparatus of the present invention need treatment to reserve a sufficient amount of water to dilute the wastewater input when needed.

The bed used in the apparatus is the kind of penetrating biological bed consisting of foam with a planar surface and a surface with many protrusion, with the empty hole to exhaust gas and allows the deposited sludge to settle to the bottom.

In one embodiment, in order for waste heterotrophic microorganisms are digested at the source of waste, the present invention proposes the first chamber is extended (by stretching) towards the waste source. This extension acts as drainage channel, wastewater collection, digestion, thus so called biological channels.

In case of insufficient surface area, the present invention provides deep pull-down processing apparatus, in vertical direction that is called biological well.

The apparatus in form of modular assembly can be parallel, depending on the capacity of wastewater to be treated to form the wastewater treatment plant with a capacity greater than one module's capacity.

According to a second aspect, the present invention provides a system for collecting and treating wastewater combining rainwater drainage comprising at least one apparatus for treating wastewater in form of modular as described above and one or more systems for collecting and transferring rainwater mixed wastewater, the system comprises:

At least one apparatus for treating wastewater in modular types as described above; and an indoor pipe system for collecting and transferring wastewater, rainwater in the building including the main vertical pipe, the substantially horizontal branch pipe; and an outdoor pipe systems for transferring wastewater combining rainwater drainage includes a horizontal pipe connected the indoor pipe system for collecting and transferring wastewater, rainwater in the building to at least one apparatus above.

According to a specific embodiment, in the case of high-rise buildings, to decapitate the kinetic energy of falling water in the main pipe from the high floor, the present invention provides a energy dissipater arranged in the main vertical pipe, located in one of the bottom floors of the building, or after certain intervals height. The energy dissipater effects in destroying kinetic energy of wastewater falling from the high floor in the main vertical pipe.

According to a specific embodiment, the outdoor transferring wastewater combining rainwater drainage further includes a energy storage device in order to maintain the kinetic energy of the water flow or prevent garbage, and water supply to dilute wastewater or to receive more waste sources.

According to another embodiment, the outdoor pipe systems for transferring wastewater combining rainwater drainage includes a biological channel. This biological channel is used to replace stormwater channel systems for road, sidewalk from the apartments, the buildings. Configuration of the biological channel include water channels with trapezoidal cross section open at the top, with a lid in form of a screen to filter garbage and to allow rainwater to flow into it. In the heart of the channel may provide with biological bed which contains heterotrophic microorganisms to digest a part or all of the organic matter in the wastewater before it is treated in wastewater treatment apparatus.

DETAILED DESCRIPTION OF THE INVENTION

Figure 1A:
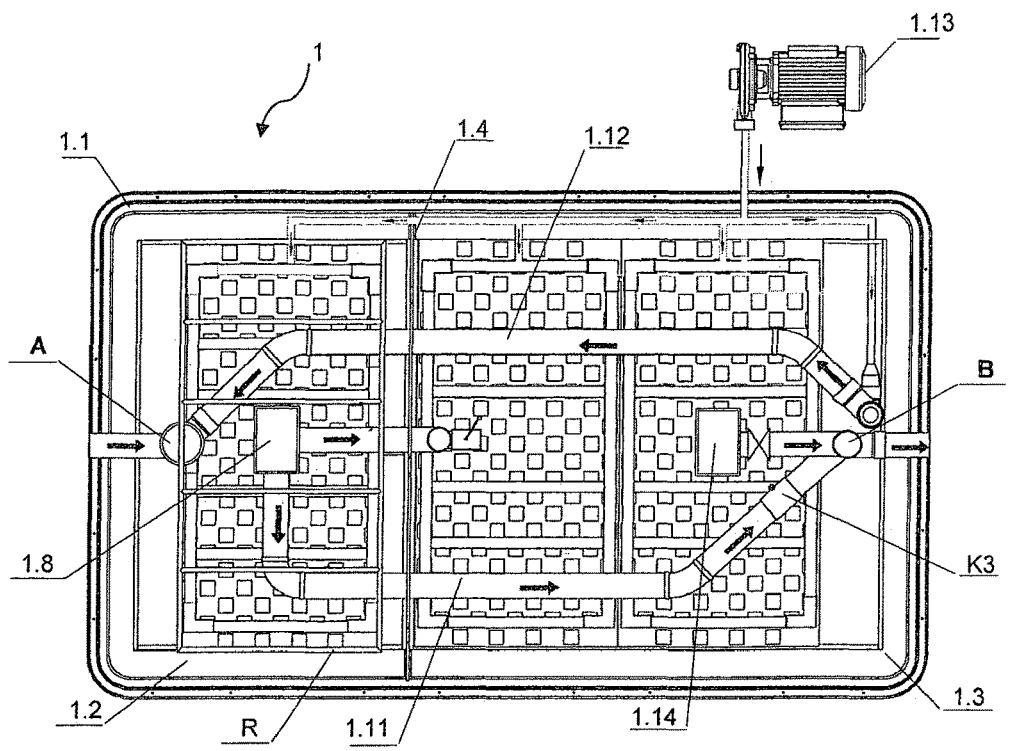
FIGS. 1a, 1b are sectional views, illustrating an structure of the apparatus for treating wastewater based on the principle of biodegradation-recombination-biodegradation according to the present invention.
Figure 1B:
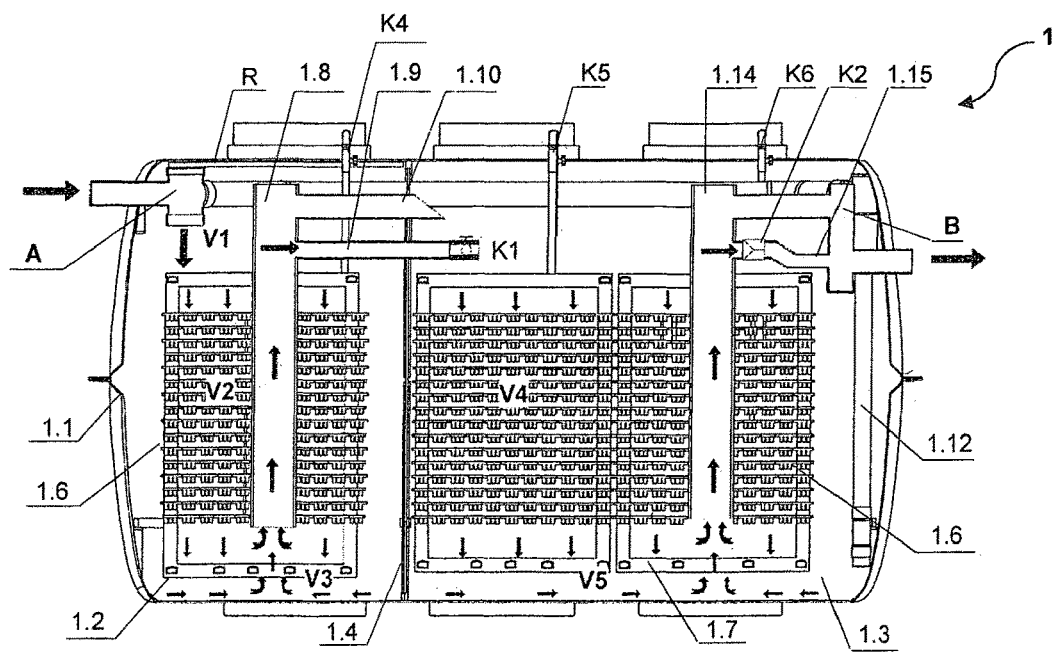

FIGS. 1a and 1b illustrate an outline configuration of a wastewater collection and treatment apparatus based on the principle of biodegradation-recombination-biodegradation process, comprising:

shell 1.1 is made by conventional material, such as stainless steel or FRP or PDCPD (dicychlorpenthadiene) resin.

The shell 1.1 comprises two halves facing each other. Each half is integrally molded or is assembled from premade modular type plates, thereby being capable of assembling into an apparatus of desired size. The modular plates are provided with wave shaped ribs and assembled together. A peep hole are made similarly to normal drainage holes.

The space inside the shell 1.1 is divided into two chambers, namely first chamber 1.2 and second chamber 1.3 which are separated by divider wall 1.4.

The first chamber 1.2 contains biological medium suitable for the growth of heterotrophic microorganisms. The first chamber 1.2 comprising 3 regions, in order from top to bottom, as follows:

a upper region V1 does not contain biological bed, has a mixing tank A for receiving wastewater mixed with clean water to dilute wastewater prior to treatment. The region V1 is also a place where waste floats and accumulates. The accumulation of waste could lead to the attachment and development of microorganisms to undesired volume, after a long time it will hinder the circulation and treatment of wastewater. In order to overcome this problem, a clean water sprayer R is provided above the region V1 to wash and break down the microorganism layer formed on the waste, prevent the microorganisms developing into biomass. The clean water used for the sprayer R is obtained from treated water.

Next is a middle region V2. The region V2 comprises biological bed 1.6 for microorganism attaching (that is called as biological bed) and support frame 1.7 for securing plates of biological bed.

A region V3 which is located at the bottom of the first chamber 1.2 (the region V3 does not comprise biological bed), is a place for receiving organic and inorganic settled sludge.

An vertical pipe 1.8 is provided passing through biological bed 1.6 in the region V2, has the lower end connected to the region V3, the upper end is at a position higher than the water inlet pipe so that the water in the region V1 does not directly overflow into the vertical pipe 1.8 while the apparatus is in a normal mode.

A horizontal pipe 1.9 connects to the pipe 1.8 at a position higher than the region V2, passing through the divider wall 1.4 and entering second chamber 1.3. A valve K1 is provided on the horizontal pipe 1.9 to control the flow rate of wastewater from the first chamber 1.2 to the second chamber 1.3.

An overflow pipe 1.10 which is provided at a position higher than the pipe 1.9 is also connected to the vertical pipe 1.8 and at a same height to the wastewater inlet line. The overflow 1.10 which passes through the divider wall 1.4 to the second chamber 1.3 conveys wastewater from the first chamber 1.2 to the second chamber 1.3 in case of great amount of wastewater.

The configuration of the second chamber 1.3 in which the recombination, biodegradation take place as follows:

Similarly to the first chamber 1.2, the second chamber 1.3 comprises biological beds 1.6 which is located on support frame 1.7 in a region V4. The support frame 1.7 is itself being an air duct configured to convey air from an air blower via valves (K5 and K6) and diffusers located in lower part of the support frame 1.7 to aerate the sludge on the biological bed 1.6 in the first chamber 1.2 such that air move from upwardly (through the biological bed), while water moves downwardly.

An region V5 is located underneath the region V4 to contain clean water subjected to treatment.

A vertical pipe 1.14 which passes through the biological beds in the region V4 having a lower end connected to the region V5, and a upper end at a position of similar height to the upper end of the pipe 1.8. The vertical pipe 1.14 is also connected to the discharge tank B via the horizontal pipe 1.15 having an one way valve K2 for discharging treated water out via the mixing tank B. The one way valve K2 only allows the water flow from the vertical pipe 1.14 to discharge tank B and prevent the wastewater from outside flowing into the second chamber 1.3.

An overflow 1.16 connects vertical pipe 1.14 to the discharge tank B at a height similar to the overflow pipe 1.10. The overflow 1.16 allows water to flow from vertical pipe 1.14 into the discharge tank B in case of great amount of inlet wastewater.

An biological safety pipe 1.11 connects the vertical pipe 1.8 to the discharge tank B at a position lower than horizontal pipes 1.9 and 1.15 to directly discharge water out from the vertical pipe 1.8 thought the discharge tank B (as shown in FIG. 1a). The direct discharging is done by opening the valve K3 in case of occurring incident (such as electric shut down, air blower broken down, . . . ). In this case, although the treated water does not meet the standard, it is necessary to direct discharge the wastewater out without treating in the second chamber 1.3 to prevent the microorganism from dying because the high concentration of waste in the wastewater exceeds allowable level because the wastewater is not diluted and supplied air.

An return pipe 1.12 has an end connected to the mixing tank A and another end connected to the bottom part of the region V5 which contains treated clean water. An end of the return pipe 1.12 is connected to an air blower 1.13 (which is provided outside of the wastewater treatment apparatus 1) to receive compressed air from the blower to pump a part of the clean water from the bottom part of the region V5 through the return pipe 1.12 return the mixing tank A. Here, the treated clean water is mixed with inlet wastewater and dilute the wastewater before treatment. The treated clean water is also supplied to the clean water sprayer R to wash the waste, break the microorganism layer formed on the waste, prevent the microorganism layer from developing to biomass in the region V1. The air blower 1.13 also supplies air to biological beds 1.6 via support frame 1.7 for the microorganisms in the second chamber 1.3 acting (via valves K5 and K6) and rinse sludge on the biological bed 1.6 in the first chamber 1.2 (via the valve K4).

Figure 2:
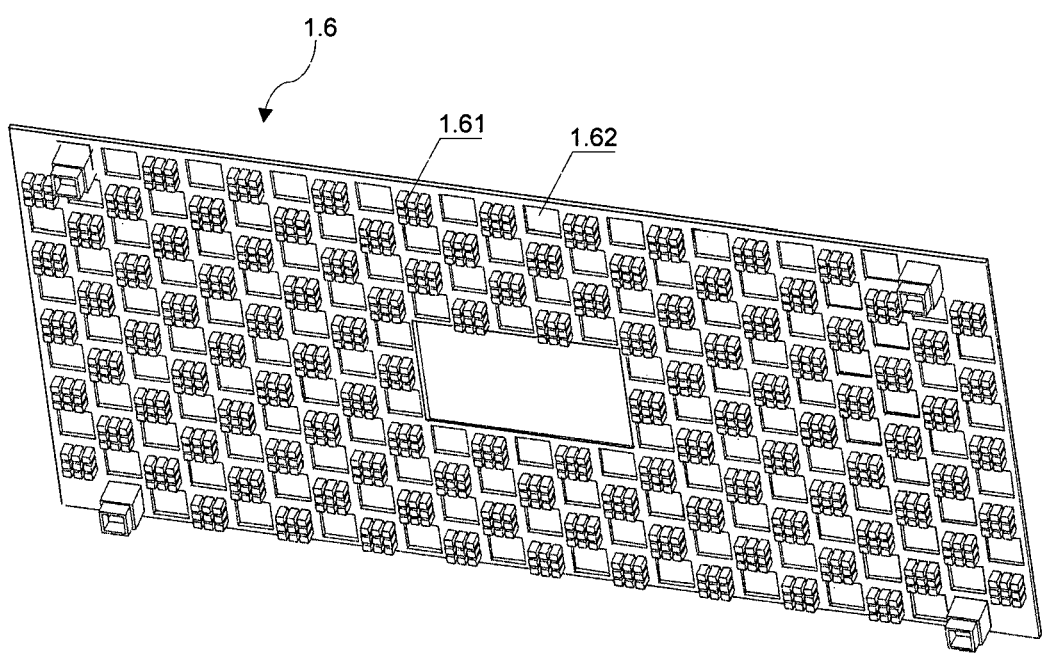
FIG. 2 shows the biological bed in form of a plate used in the apparatus for treating wastewater according to the present invention.

According to a preferred embodiment, the biological beds 1.6 in form of a plate for the microorganisms attaching is configured to allow air pass through many pores. The plate of biological bed are porous plate having one planar surface and one surface having protrusion 1.61 and holes 1.62 for releasing exceeding gas and allowing the sludge to settle down on the bottom of the apparatus (as shown in FIG. 2). According to a specific embodiment, the biological bed 1.6 has an are of about 8000 $m^2/m^3$, having a empty level of about 50%, is placed in horizontal direction, is secured to the support frame 1.7 and secured to the wall of the apparatus. Material of the biological bed used by the present invention is made of polyurethane, thermal resin, ceramic, porcelain, high grade cement, etc.

The performance of the wastewater treatment apparatus as follows:

The wastewater is diluted by mixing it with clean water in the mixing tank A, then enter into the first chamber 1.2 in the region V1. In the region V1, some minerals are recombined by autotrophic microorganisms, while heterotrophic microorganisms biodegrades organic compounds, then the wastewater passes the region V2 of biological beds. In the region V2, the waste and autotrophic microorganisms are substantially digested by heterotrophic microorganisms. The content of oxygen in water is consume greatly, thus the oxygen content gradually decreases in accordance with the depth of the chamber. The recombination as well as biodegradation of autotrophic microorganisms gradually decreases, while the mineralization digestion of organic compounds gradually increases, the water keep moving downwardly to the bottom of the apparatus (the region V3). In the region V3, sludge is detained, the water is conveyed to the second chamber 1.3 through the vertical pipe 1.8 and horizontal pipe 1.9. Once the amount of water is large, water would rise and flow through the overflow pipe 1.10 into the second chamber 1.3.

After passing the first chamber 1.2 into the second chamber 1.3, the water move downwardly while which is supplied from outside moves upwardly. Wastewater containing nutrients mixed with $CO_2$ is as digestive for autotrophic microorganisms to recombine to organic compounds. The heterotrophic microorganisms generate energy necessary for the recombination. After passing the region V4, the water reaches the region V5 that contains poor nutrients as well as organic compounds. Almost autotrophic microorganisms is killed by the heterotrophic microorganisms. The heterotrophic microorganisms is also kill them self in the region V4.

After being treated in the region V4, wastewater becomes clean water which contains very little planktonic microorganisms in the water. These microorganisms would settle down the region V5 and are further destroyed. The clean water moves downwardly the region V5, then though the vertical pipe 1.14 and horizontal pipe 1.15 via one way valve K2 passes to the discharge tank B and discharge out. A part of the clean water in the region V5 is recirculate to the mixing tank A by compressed air from the air blower 1.13 through the return pipe 1.12. In the mixing tank A, the clean water is mixed to dilute the inlet wastewater prior to treatment. The clean water is also supplied to clean water sprayer R to wash waste, break the microorganisms layer formed on the waste, prevent the microorganisms layer from developing to biomass in the region V1.

Residue generated during the action of the microorganisms which settles down the region V3 and V5 is regularly pumped out though the vertical pipe 1.8 and 1.14 respectively.

In case of incident occurrence due to broken down or electric shut down in a long time, the microorganisms would not able to act if still allow wastewater to enter the apparatus, then the backlog waste would generates a lot of organic sludge in the first chamber 1.2.

Meanwhile, in order to keep the stability of the microorganisms in the first chamber 1.2 and second chamber 1.3, the operator should use clean water (from an external source instead of recirculated water) to pump into the mixing tank A, close the air valves K5 and K6 and open valve K3 to allow the wastewater to flow straightly from the vertical pipe 1.8 through biological safety pipe 1.11 into the discharge tank B. If the amount of clean water supplied from an external source into a mixing tank full on demand and are maintained for the duration of the incident that will ensure the wastewater in the output of the device still achieve discharge standards.

When the amount of sludge and microorganisms in the region V2 accounts for about 10-15% of the first chamber 1.2 volume, open the valve K4 to allow air to wash the biological beds 1.6 in the region V2 and sucked sludge out through the vertical pipe 1.8.

Figure 1C:
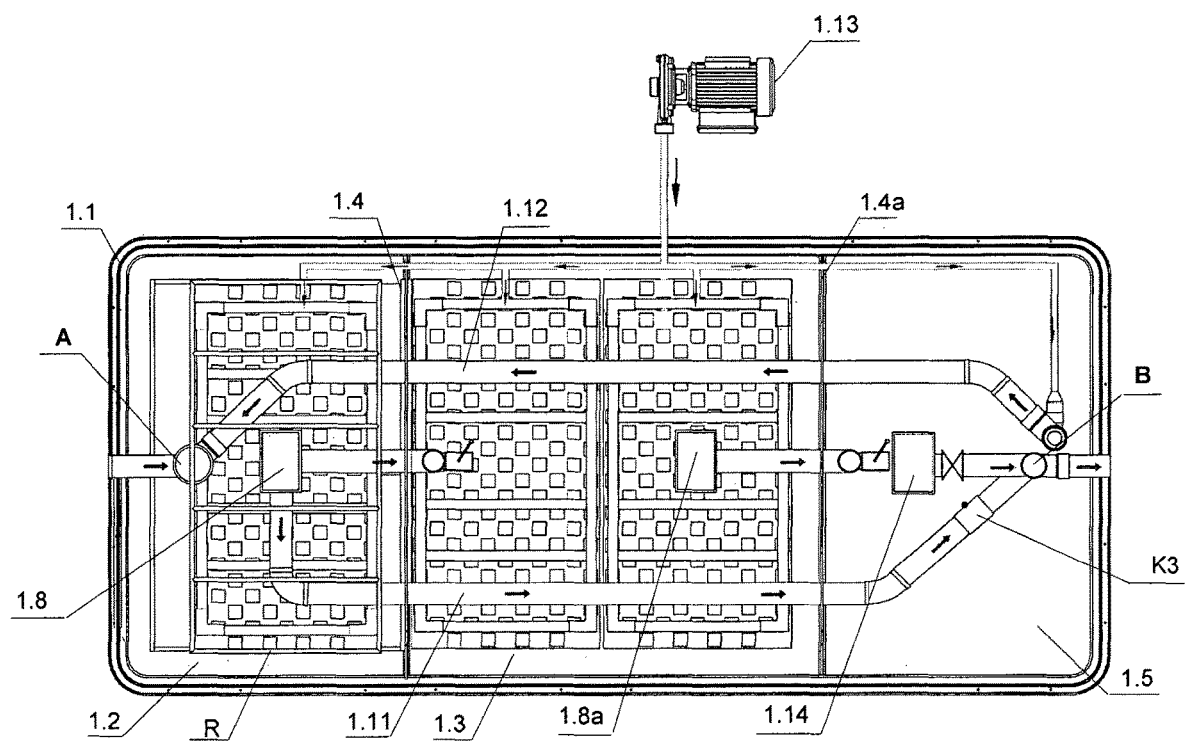
FIGS. 1c and 1d are views, illustrating the configuration of the apparatus for treating wastewater having a third chamber for containing treated clean water according to one embodiment of the present invention.
Figure 1D:
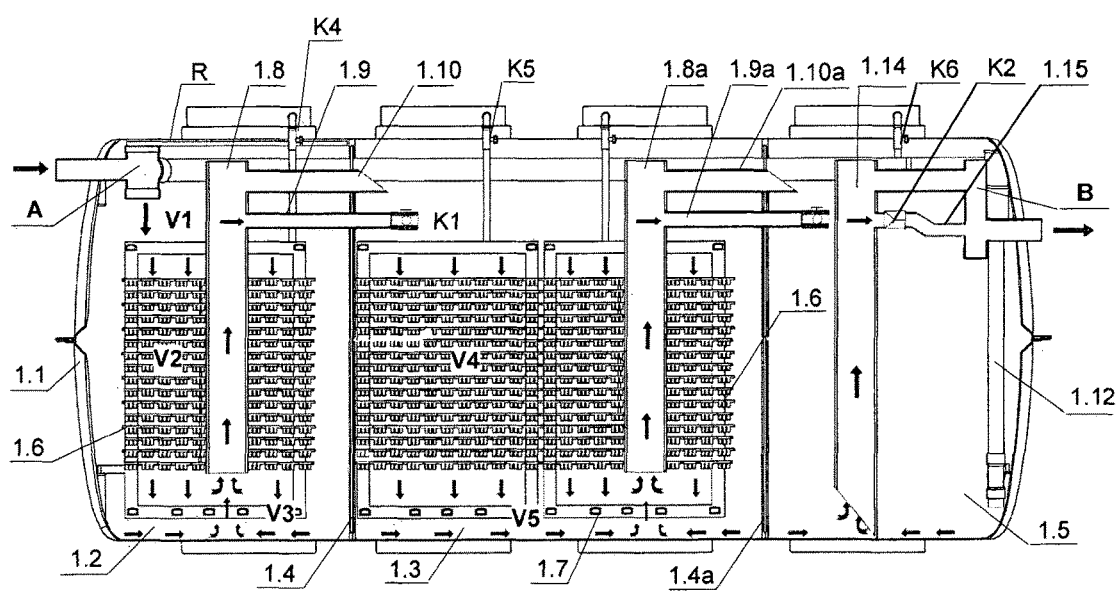

In case of need to storage more treated clean water to be used for recirculation purposes or other purposes, the present invention provides wastewater treatment apparatus 1 may further comprises a third chamber 1.5 for containing clean water. According to this embodiment, the wastewater treatment apparatus 1 has the first chamber 1.2 completely identical to the apparatus described above. The configuration of the second chamber 1.3 is similar to the above, however, vertical pipe systems 1.14, and horizontal pipe 1.15 and discharge chamber B is moved to the third chamber 1.5, instead that the second chamber 1.3 is provided with a vertical pipe 1.8a, horizontal pipe 1.9a and overflow pipe 1.10a similar to the vertical pipe 1.8, horizontal pipe 1.9 and overflow pipe 1.10 of the first chamber 1.2. The second chamber 1.3 is separated from the third chamber 1.5 by a divider wall 1.4a similar to the divider wall 1.4 above (as shown in FIGS. 1c and 1d).

The operation of the wastewater treatment apparatus 1 according to this embodiment is similar to the apparatus as described above, but it has difference in that, the wastewater after treatment in the region V5 will flow to the third chamber 1.5 through the vertical pipe 1.8a, horizontal pipe 1.9a to be stored in the third chamber 1.5. Clean water stored in the third chamber 1.5 will be recirculated to the mixing tank A to dilute the inlet wastewater and to wash waste or discharged through the discharge tank B to the environment or used for other purposes.

Therefore, the wastewater treatment apparatus according to the first aspect of the present invention is capable of strictly treating waste in the wastewater without generating organic sludge, unpleasant smells, without using antiseptic process. Furthermore, the apparatus according to the present invention has simple configuration, easy to operate, produce and consumes less energy.

Figure 3:
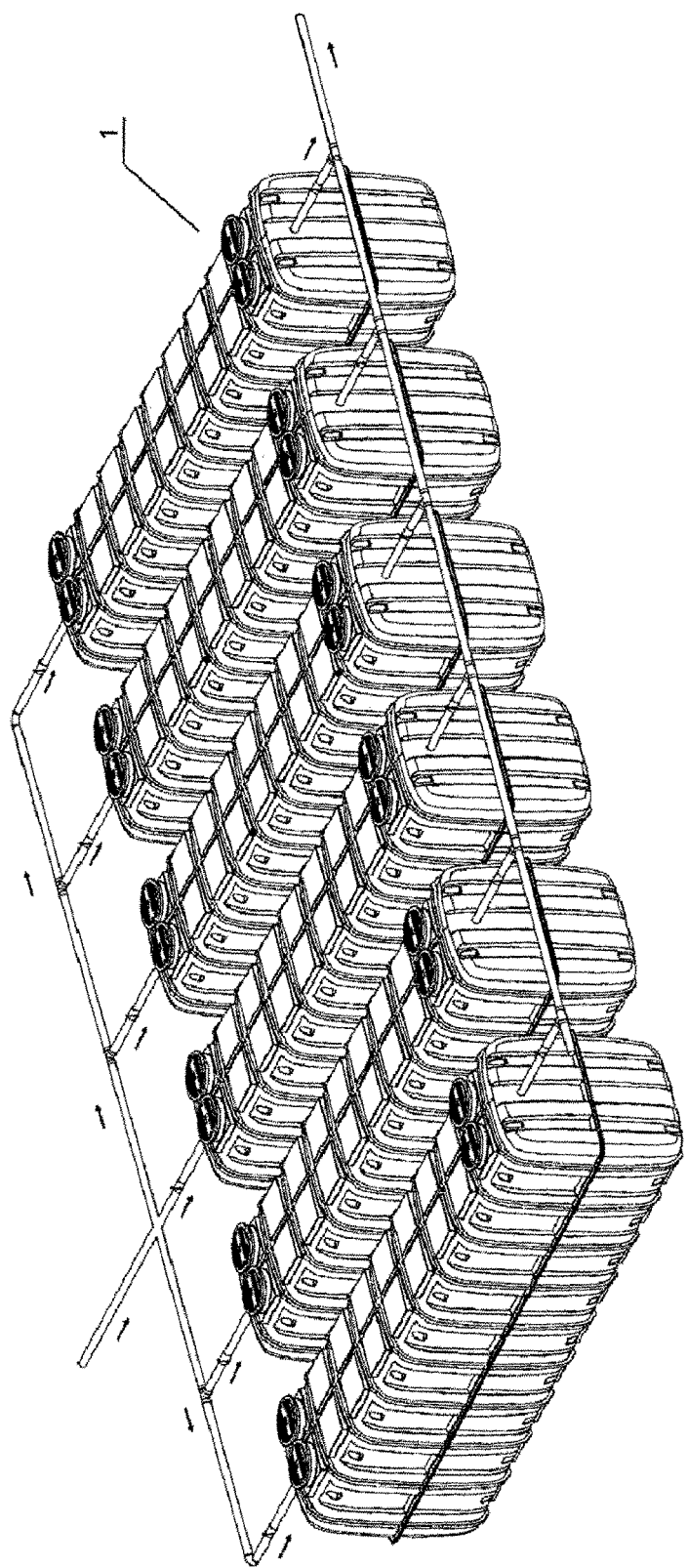
FIG. 3 shows how to assemble the apparatus in form of a molular type into a wastewater treatment plant according to one embodiment of the present invention.

Depending on the capacity requirements for each wastewater treatment plant, the present invention can carry out parallel assembling many wastewater treatment apparatuses 1 together to form the wastewater treatment plant with a desired capacity. FIG. 3 shows the wastewater treatment plant are assembled from six wastewater treatment apparatus 1 of modular type.

According to a second aspect, the present invention provides an system for collecting and treating wastewater combining with rainwater drainage used for buildings, capable of treating biodegradable waste contained in household wastewater, hospital wastewater, processing, livestock wastewater, etc. According to a preferred embodiment, the system comprises:

at least one wastewater treatment apparatus 1 as described above that operates based on biodegradation-recombination-biodegradation process, in which only uses autotrophic microorganisms and heterotrophic microorganisms to totally digest organic waste contained in the wastewater;

a indoor pipe system is configured to collect and transfer wastewater, rainwater including main vertical pipe 2, substantially horizontal branch pipe; and a outdoor pipe system is configured to transfer wastewater and combine rainwater drainage including vertical pipe 3 for connecting the indoor pipe system for collecting and transferring wastewater and rainwater to at least one wastewater treatment apparatus 1 above.

Figure 8:
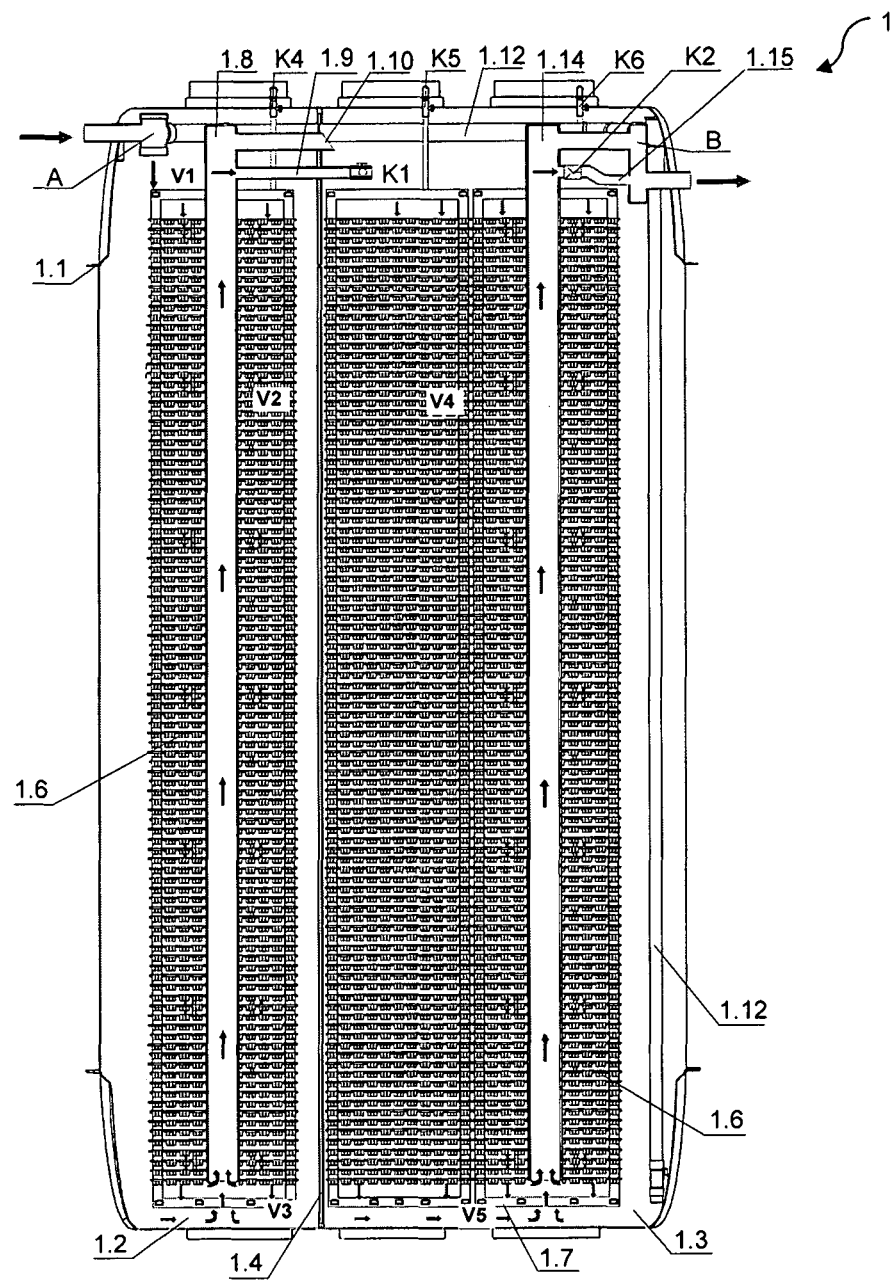
FIG. 8 is a drawing showing the biological wells according to the present invention.

Wherein:

the wastewater treatment apparatus 1 may be a single apparatus or multiple apparatus connected in parallel with a number of the apparatus depending on the processing capability. The wastewater treatment apparatus 1 can be the apparatus of only two chambers 1.2 and 1.3 (FIGS. 1a and 1b), or three-chamber type with chambers 1.2, 1.3 and 1.5 (FIGS. 1c and 1d), or the type of apparatus of biological well (FIG. 8) depending on the conditions of the location of installation and operating conditions. FIG. 3 shows an embodiment in which 6 wastewater treatment apparatuses 1 are connected in parallel.

The indoor pipe system for collecting and transferring wastewater and rainwater comprises:

Main vertical pipe 2 is arranged along the height of the building to collect wastewater from the branch pipes 2.1 discharged from the apartments and the branch pipes 2.2 for collecting rainwater from the roof or floor. The branch pipes 2.1 and 2.2 almost horizontally transfer wastewater and rain to the main vertical water pipe 2 and is connected to the pipe line of the pipe 2 by horizontal T-shaped connector 2.3. When the water flow from the branch pipes enter the main vertical pipe 2, it will fall down and cause the air pressure in the pipe increases as compared to gas pressure outside the pipe. Because the top of the main vertical pipe 2 is opened, the pressure in the top of the pipe line is equal to air pressure, that cause the air inside the pipe moves upward and escape via the open. The main vertical pipe 2 is formed by connecting the pipe with increasing diameter from top to bottom.

In the case of height buildings, in order to reduce kinetic energy of wastewater falling in the vertical pipe 2 from the top floors down the main pipe, the present invention proposes an arrangement of a energy dissipator 4 in the main pipe 2 in position located in one of the bottom floors of the building or at certain intervals of height.

Figure 5A:
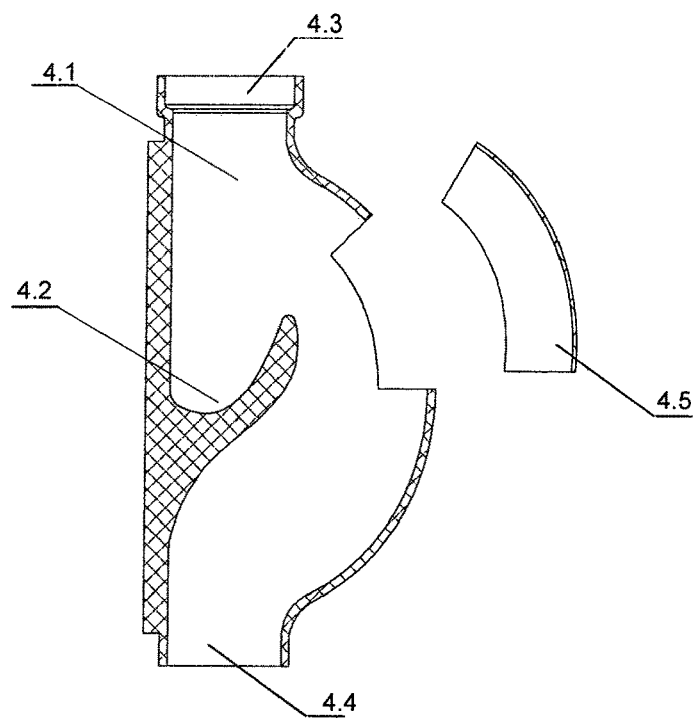
FIGS. 5a and 5b show an energy dissipator used in the system according to the present invention.
Figure 5B:
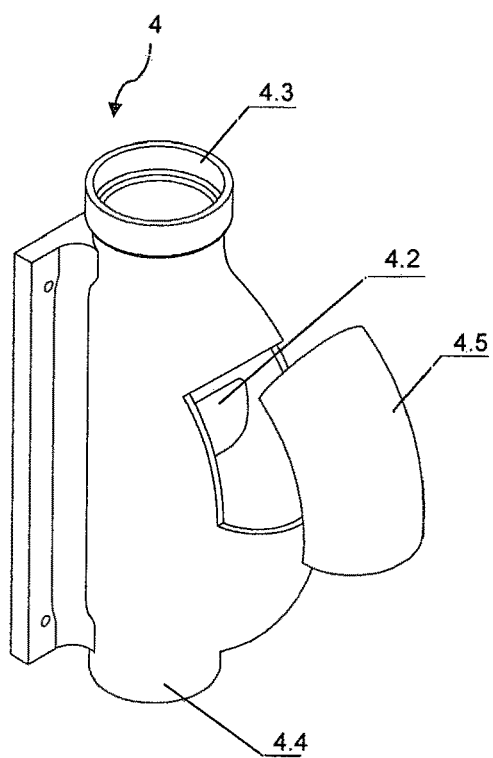

Specifically, the energy dissipator 4 (FIGS. 5a and 5b) are installed on the main vertical pipe 2 in an appropriate height of the building and in the upper corner position redirected from vertical line to the horizontal. The configuration of this box includes a hollow chamber 4.1 and the space inside the hollow chamber 4.1 has a fixed water pond 4.2 to destroy kinetic energy of water falling freely from the top. A box with upper connectors 4.3 into which the water falls and lower connector 4.4 in the bottom for water to flow out, both connectors has suitable shape for connection to the main vertical pipe 2. The energy dissipator 4 also has peep hole 4.5 with a lid made of transparent material to observe inside. The energy dissipator 4 is fastened to the wall or column by the bolt, screw fixing common ways. When wastewater falls into the energy dissipator 4, small waste will continue to move in the water cycle and participate in subsequent freefall, large waste will be retained in the energy dissipator. Regular observing through the peep hole 4.5, the operator opens the door and take the waste out.

Figure 4:
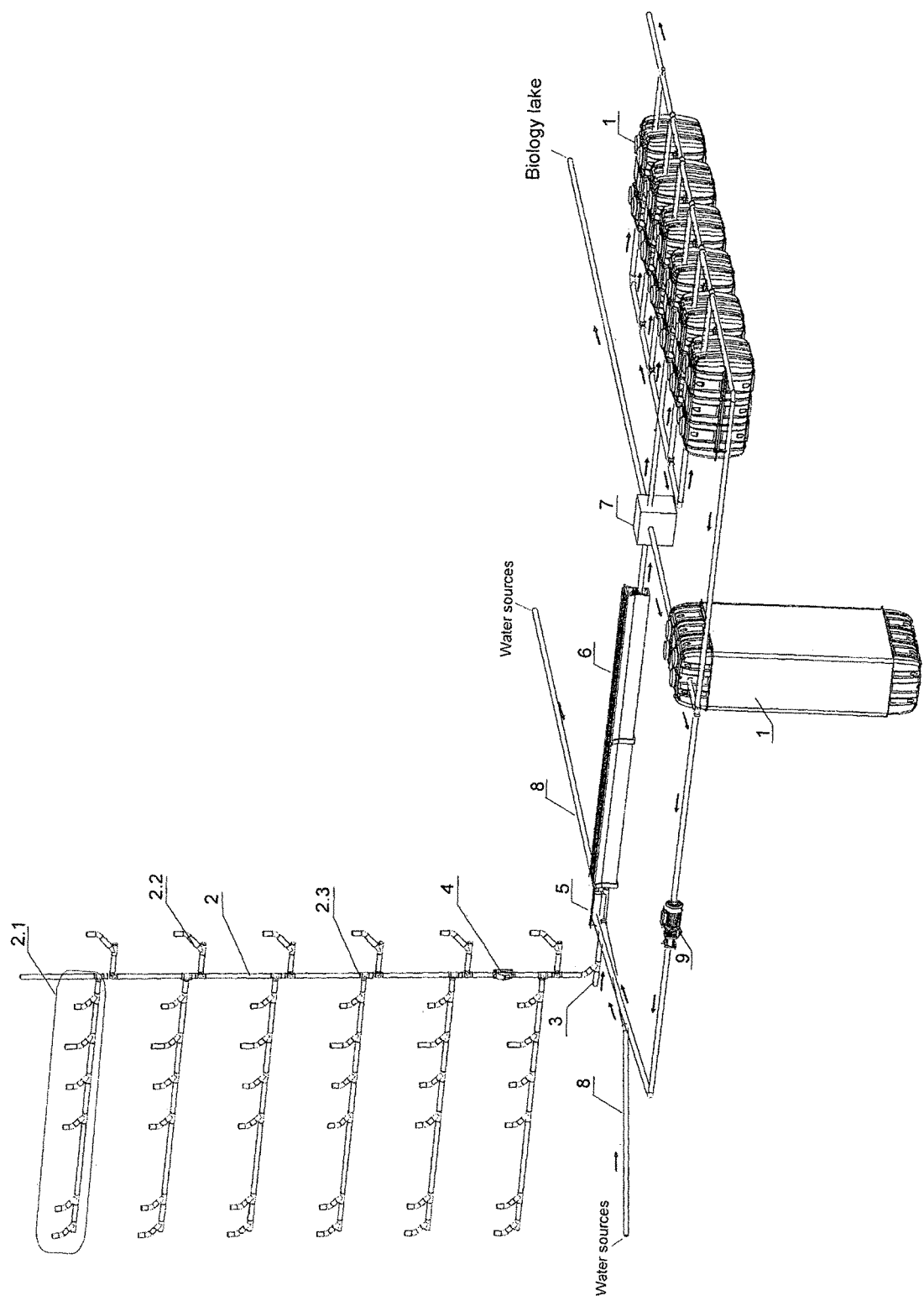
FIG. 4 shows a diagram of the system for collecting and treating wastewater combining rainwater drainage of the present invention.

As shown in FIG. 4, the outdoor pipe system for transfer wastewater combining rainwater drainage includes: a horizontal pipe 3 is connected to the indoor pipe system for collecting and transferring wastewater and rainwater to at least one wastewater treatment apparatus 1 above.

Figure 6A:
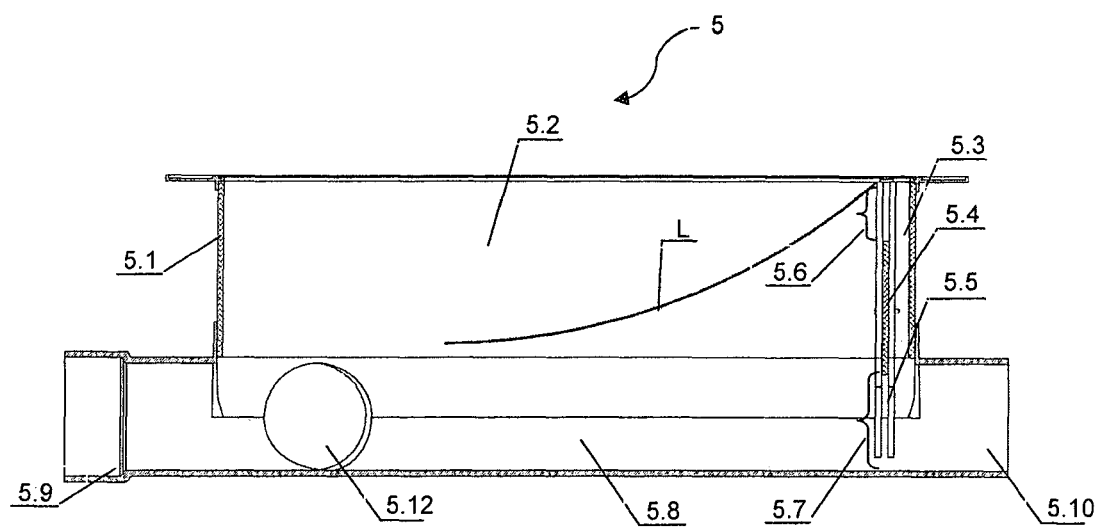
FIG. 6a is a front sectional view of the energy storage device used in the system according to the present invention.
Figure 6B:
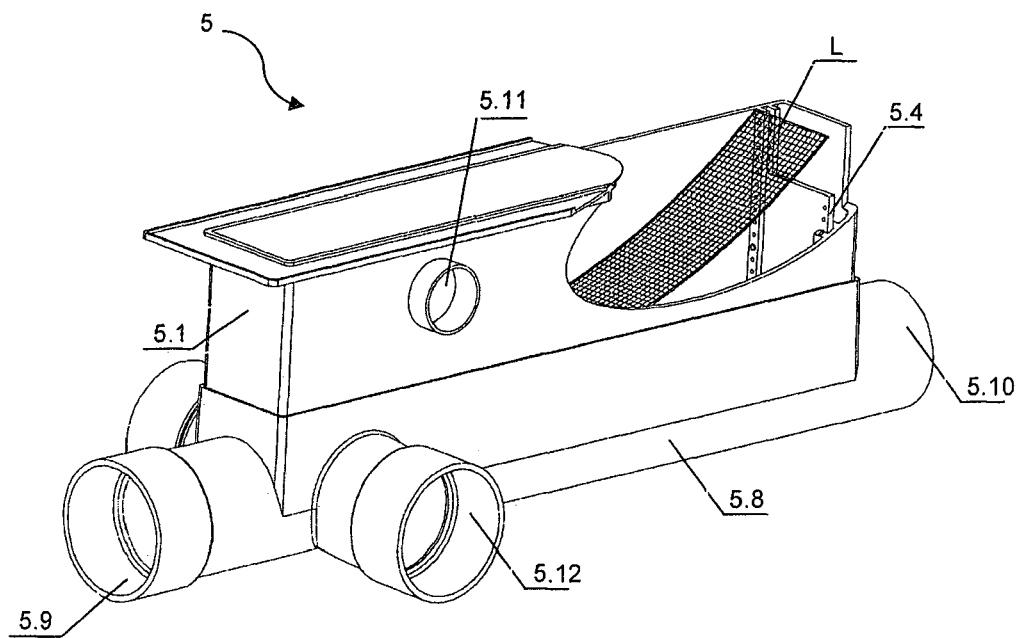
FIG. 6b is a perspective view of the energy storage device used in the system according to the present invention.

In case of the position of wastewater treatment apparatus 1 is located away from the building, the present invention proposes an arrangement of a energy storage device 5 (FIGS. 6a and 6b) on the vertical pipe 3 for storage of wastewater potential to facilitate the flow of wastewater in the downstream pipe of the device. The configuration of this energy storage device includes a water tank 5.1 in rectangular shape. This tank 5.1 is divided into two compartments 5.2 and 5.3 by a partition 5.4. The partition 5.4 can slide on a slide slots 5.5 which are created in the sides of the tank 5.1 to adjust the amount of water flowing through the spill gate 5.6 and outlet 5.7. The whole bottom of the tank 5.1 is connected to the horizontal pipe 5.8 with a water inlet 5.9 and water outlet 5.10. A screen L is arranged in the back part of the tank 5.1 to separate and hold floated waste with large size.

A vent hole 5.11 is formed on a side of the tank 5.1 to connect to the water pump 9 (FIG. 4) which pumps treated clean water from the wastewater treatment apparatus 1 into the tank 5.1 to wash waste and simultaneously supply clean water to mix with wastewater.

In addition to the water inlet 5.9, the energy storage device 5 may further has water inlets 5.12 and 5.13 which connected to the horizontal pipe 5.8 to receive wastewater from other sources. Normally, when there are no other sources of wastewater, the water inlets 5.12 and 5.13 can be closed by the corresponding lids (not shown in the figure).

The operating principle of the energy storage device 5 as follows:

When the amount of wastewater is large, a part of water is retained in the tank 5.1 and rises to create the potential energy in the energy storage device 5, this potential energy is converted into kinetic energy to maintain the flow of the wastewater when the wastewater amount is low. When the amount of water in the tank 5.1 exceeds the allowable level, the water will overflow from the compartment 5.2 to the compartment 5.3 through spill gate 5.6 to get out of the tank 5.1 in order to avoid the water flowing out through the lid to the environment. The partition 5.4 slides along the slots 5.5 to adjust the flow of water out of the energy storage device 5 and store water in the tank 5.1 at the peak of discharge. When the outlet 5.7 is clogged due to waste, water will fill up very quickly and swept through the spill gate 5.6. Large size garbage is retained by the screen L and is collected periodically for disposal.

Figure 7A:
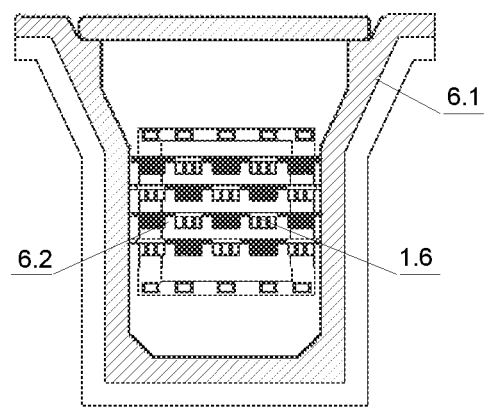
FIG. 7a is a cross sectional view of the biological channel used in the system according to the present invention.
Figure 7B:
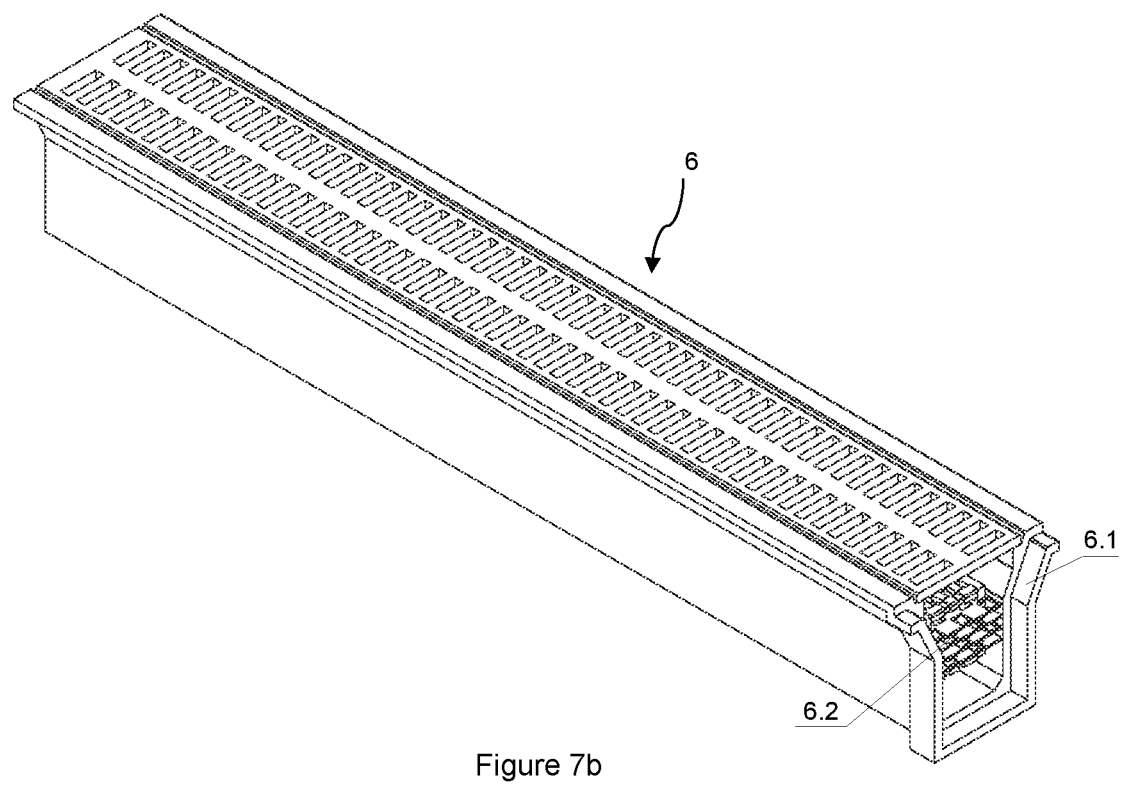
FIG. 7b is a perspective view of the biological channel used in the system according to the present invention.

According to another embodiment, the system of the present invention comprises a biological channel 6 (FIGS. 4, 7a and 7b) which is an open channel with a lid in form of a screen for waste and collection rainwater. A space 6.1 inside the biological channel 6 is used for rainwater drainage, a part 6.2 of the space 6.1 is provided with biological beds 1.6 for water treatment.

According to another embodiment, the system for collecting and treating wastewater combining rainwater drainage according to the present invention further comprises a container 7 which is arranged in upstream of the inlet of the wastewater treatment apparatus 1. The container 7 has an effect of distributing the wastewater into the wastewater treatment apparatus 1 as desired.

The water pump 9 is arranged to transfer treated clean water to the energy storage divide 5 to wash waste and dilute wastewater prior to treatment.

Effects of the Present Invention

The apparatus for collecting and treating wastewater and the system for collecting and treating wastewater combining rainwater drainage according to the present invention have huge economic, technical, environmental and social effects. Specifically:

Apparatus for treating wastewater according to the present invention occupies only a maximum of about 50% by volume of the current devices having the same processing capacity, with simple structure, easy to manufacturing, construction, saving land, saving energy and other costs. The present invention treats wastewater without using chemicals, consumes less energy, reduces the initial investment and operation costs. The apparatus of the present invention could be produced in industrial scales and can be mass produced with uniform quality, less defects, easy to install, simple; production time, construction is fast, simple construction methods, capable of performing entirely mechanized.

The system for collecting and treating wastewater combining rainwater drainage does not need to use septic tanks, grease separators, water conditioning equipment. All household wastewater in the buildings, rainwater are commonly collected into a drainage pipe line, that is very suitable for urban areas with outdated infrastructure which is necessary to build a new drainage system outside the house and a separate collection system for collecting wastewater.

The system for collecting and treating wastewater combining rainwater drainage of the present invention is easy to operate, simple, easy to be replaced and repaired, easy to be increased or decreased capacity as desired. The treated water meets drinking water and industrial water standards for reuse by conventional methods, capable of thoroughly treat household, hospital, processing, livestock wastewater according to microbiological processes: biodegradation-recombinance-biodegradation for digestion of biodegrable waste in water. The process of treating wastewater is totally conducted by natural, indigenous microorganisms and friendly environment, without using chemicals, radiation physics or extraneous microorganisms.

The system for collecting and treating wastewater, reusing water according to the present invention does not generate hazardous waste, unpleasant smells and organic sludge in the collecting and treating process. The present invention thoroughly treating waste substances in water (the tertiary treatment), capable of treating many waste sources with different capacity.

The invention claimed is:

1. An apparatus for treating wastewater (1) based on biodegradation-recombination-biodegradation process, comprises:
    a shell (1.1) comprising two halves facing each other;
    the space inside the shell (1.1) is divided into a first chamber (1.2) and a second chamber (1.3) by a divider wall (1.4), wherein:
    the first chamber (1.2) contains biological medium suitable for heterotrophic microorganisms growth, and is divided into three regions, in order from top to bottom, including:
    an upper region (V1) has a mixing chamber (A) for receiving wastewater and clean water and mixing the clean water to the wastewater to dilute the wastewater before treatment, and a water sprayer (R) located above the upper region (V1) for spraying clean water to wash garbage,
    a middle region (V2) contains biological beds (1.6) for immobilizing aerobic microorganism, said biological beds are held in a support frame (1.7), wherein the support frame (1.7) itself is an air duct for conveying air from an air blower through a valve (K4) and diffusers located in lower part of the support frame (1.7) to wash sludge out of the biological beds (1.6) located in the first chamber (1.2),
    a lower region (V3) for receiving settled inorganic sludge and a part of organic sludge,
    a vertical pipe (1.8) passes through the biological beds (1.6) in the middle region (V2), has a lower end connected to the lower region (V3) and an upper end is higher than a water inlet pipe of the first chamber (1.2) so that water in the upper region (V1) does not directly overflow into the vertical pipe (1.8) when the apparatus is in normal mode,
    a horizontal pipe (1.9) is connected to the vertical pipe (1.8) at a position higher than the middle region (V2), passes through the divider wall (1.4) to enter the second chamber (1.3), the horizontal pipe has a valve (K1) to regulate flow of wastewater from the first chamber (1.2) to the second chamber (1.3);
    an overflow pipe (1.10) is connected to the vertical pipe (1.8) at a height of nearly equal to height of the water inlet pipe of the first chamber (1.2), and passes through the divider wall (1.4) to enter the second chamber (1.3);
    the second chamber (1.3) contains the biological beds (1.6) in a fourth region (V4) on a support frame (1.7), wherein the support frame (1.7) itself is an air duct for conveying air from an air blower to supply air to the biological beds (1.6) in the second chamber (1.3) through valves (K5 and K6) and diffusers located in lower part of the support frame (1.7);
    a fifth region (V5) located beneath said fourth region (V4) to store clean water which has been treated and sediment;
    a vertical pipe (1.14) passes through the biological beds (1.6) and has a lower end connected to the fifth region (V5) and an upper end at a height equal to the height of the upper end of the vertical pipe (1.8), the vertical pipe (1.14) is connected to a discharge tank (B) via a horizontal pipe (1.15) which has a one way valve (K2) to discharge treated clean water out through the discharge tank (B);

an overflow pipe (1.16) connects the vertical pipe (1.14) to the discharge tank (B) at a height equal to the height of the overflow pipe (1.10);

a biological safety pipe (1.11) connects the vertical pipe (1.8) to the discharge tank (B) at a position lower than the horizontal pipes (1.9) and (1.15) to directly discharge water from the vertical pipe (1.8) out through the discharge tank (B);

a return pipe (1.12) has one end connected to the mixing chamber (A) and another end connected to an end part of the fifth region (V5) and is connected to an air blower (1.13) to receive compressed air from the air blower to pump a part of clean water from the fifth region (V5) through the return pipe (1.12) for returning to the mixing chamber A and supplying clean water to the water sprayer (R) located in the upper region (V1) to wash the garbage.

2. The apparatus according to claim 1, wherein each of the half shell is integrally molded or is assembled from pre-made modular plates, thereby enabling to assembly the apparatus to an apparatus of arbitrary size.

3. The apparatus according to claim 1, wherein the biological beds (1.6) are in form of porous plates having a planar surface and another surface having protrusion (1.61), the porous plates have holes (1.62) to release excess gas and allow the settled sludge to settle down to the bottom of the apparatus.

4. The apparatus according to claim 1, wherein the wastewater treatment apparatus (1) further comprises a third chamber (1.5) for containing clean water, wherein the vertical pipe (1.14), the horizontal pipe (1.15) and the discharge tank (B) are moved to the third chamber (1.5) instead of being located in the second chamber (1.3); and an vertical pipe (1.8a), an horizontal pipe (1.9a) and an overflow pipe (1.10a) which are the same as the vertical pipe (1.8), the horizontal pipe (1.9) and the overflow pipe (1.10) of the first chamber (1.2) are provided in the second chamber (1.3); and the second chamber (1.3) and the third chamber (1.5) are separated by a second divider wall (1.4a).

5. A system for collecting and treating wastewater combining rainwater drainage used for buildings, comprises:—at least one wastewater treatment apparatus (1) according to any one of claims 1 to 4; —a indoor pipe system for collecting and transferring wastewater, rainwater, comprising a main vertical pipe (2), substantially horizontal branch pipes; and an outdoor pipe system for transferring wastewater and combining rainwater drainage comprising a horizontal pipe (3) for connecting the indoor pipe system for collecting and transferring wastewater, rainwater located to said at least one wastewater treatment apparatus (1).

6. The system according to claim 5, wherein the system further comprises an energy dissipater (4) provided on the main vertical pipe (2) for dissipating kinetic energy of the wastewater in the main vertical pipe from the building.

7. The system according to claim 6, wherein the energy dissipater (4) is configured to comprise a hollow box (4.1) having a water tank (4.2), an upper connector (4.3) and a lower connector (4.4), peep hole (4.5) with a lid made of transparent material for observing inside.

8. The system according to claim 5, wherein the system further comprises a energy storage device (5), said energy storage device comprises a rectangular tank (5.1) for containing water comprising a first compartment (5.2) and a second compartment (5.3) with a partition (5.4) being capable of sliding on slide slots (5.5) formed in two sides of the rectangular tank (5.1); a spill gate (5.6); outlet (5.7); the bottom of the rectangular tank (5.1) is connected to a horizontal tube (5.8); a screen (L) is arranged in downstream of the rectangular tank (5.1) to separate and store waste; a vent hole (5.11) for connecting the first compartment (5.2) to a water pump (9).

9. The system according to claim 8, wherein the energy storage device (5) further comprise water inlets (5.12 and 5.13) connected to the horizontal tube (5.8) to receive wastewater from other sources.

10. The system according to claim 5, wherein the system further comprises a biological channel (6) which is an open channel with a lid in form of a screen to collect waste and rainwater, said biological channel comprises a part for rainwater (6.1) and a part for wastewater treatment (6.2) which is provided with biological beds (1.6).

\* \* \* \* \*